United States Patent
Yerli

(10) Patent No.: US 9,065,803 B2
(45) Date of Patent: Jun. 23, 2015

(54) PRIVACY-BASED IDENTITY

(71) Applicant: Crytek IP Holding LLC, Wilmington (DE)

(72) Inventor: Cevat Yerli, Frankfurt am Main (DE)

(73) Assignee: Crytek IP Holding LLC, Wilmington, DE (US)

( * ) Notice: Subject to any disclaimer, the term of this patent is extended or adjusted under 35 U.S.C. 154(b) by 0 days.

(21) Appl. No.: 13/689,550

(22) Filed: Nov. 29, 2012

(65) Prior Publication Data

US 2013/0205400 A1  Aug. 8, 2013

Related U.S. Application Data

(60) Provisional application No. 61/595,626, filed on Feb. 6, 2012, provisional application No. 61/595,642, filed on Feb. 6, 2012.

(51) Int. Cl.

| | |
|---|---|
| *G06F 7/04* | (2006.01) |
| *G06F 17/30* | (2006.01) |
| *H04N 7/16* | (2011.01) |
| *H04L 29/06* | (2006.01) |
| *G06F 21/60* | (2013.01) |

(52) U.S. Cl.
CPC .............. *H04L 63/04* (2013.01); *G06F 21/604* (2013.01); *H04L 63/0407* (2013.01)

(58) Field of Classification Search
CPC ........ H04L 63/04; H04L 51/32; G06F 21/604

USPC ........................................................ 726/26
See application file for complete search history.

(56) References Cited

U.S. PATENT DOCUMENTS

| | | | |
|---|---|---|---|
| 2009/0070334 A1* | 3/2009 | Callahan et al. ................. | 707/9 |
| 2009/0125521 A1* | 5/2009 | Petty ................................. | 707/9 |
| 2010/0048161 A1* | 2/2010 | He et al. ..................... | 455/404.1 |

FOREIGN PATENT DOCUMENTS

WO  2009/033182 A1  3/2009

OTHER PUBLICATIONS

Google Patents Search for US20130205400.*
European Search Report mailed May 10, 2013, in European Application No. 12 19 5150.3, filed Nov. 30, 2012, 7 pages.

* cited by examiner

*Primary Examiner* — Arvin Eskandarnia
(74) *Attorney, Agent, or Firm* — Christensen O'Connor Johnson Kindness PLLC

(57) ABSTRACT

The present disclosure relates to a privacy-based representation of a user identity within an online system. A method for representing a user identity within an online system is provided, comprising: requesting a user identity of a user of the online system by a viewer; retrieving a status of the viewer with regard to the user; based on the status of the viewer, determining a representation of the user identity; and providing the representation of the user identity to the viewer. Furthermore, an online system and a data structure representing a user identity of a user of an online system are defined.

12 Claims, 2 Drawing Sheets

PRIVACY-BASED IDENTITY

CROSS-REFERENCE TO RELATED APPLICATIONS

This application claims the benefit of U.S. Provisional Patent Application No. 61/595,626, filed Feb. 6, 2012, and U.S. Provisional Patent Application No. 61/595,642, filed Feb. 6, 2012, the disclosures of which are incorporated by reference herein in their entirety.

TECHNICAL FIELD

The present disclosure relates to a method for representing a user identity within an online system.

BACKGROUND

Online systems, platforms, and services, such as social networks and communication platforms, typically require each user of the online system to generate a profile identifying the respective user, for example, by specifying a name and providing an image of the user. Other registered users of the online system, as well as unregistered public viewers exploring the online system, may access the profiles of registered users and view the respective details. However, this may be undesirable since sensitive data may be retrieved by a large group of viewers without any control by the owner of the identity data. Thus, a user of an online system may withhold identity details as a precaution. Another problem arises if a user in a social network predominantly used by his friends generates a detailed profile with characteristics related to leisure activities which, however, may be inappropriate if the profile is being viewed by colleagues, business associates, or other viewers which are not necessarily friends of the user.

SUMMARY

The present disclosure describes embodiments that improve the protection of privacy related to information identifying a user of the online system. In particular, the present disclosure relates to a user identity enabling changing representations based on a privacy status of a viewer of the user identity. A method for representing a user identity within an online system and a respective online system are described. Furthermore, a computer-readable medium and a data structure are described.

A method for representing a user identity within an online system according to the present disclosure comprises the steps of requesting a user identity of a user of the online system by a viewer, retrieving a status of the viewer with regard to the user, and based on the status of the viewer, determining a representation of the user identity. The representation of the user identity is thereafter provided to the viewer.

The representation of the user identity is therefore dependent on the requesting viewer and his or her affiliation to the user being identified by the user profile. All users of the online system, such as a social network, may create a user profile that allows for a recipient-targeted presentation of the user's identification. Thus, a user of the online system can appear within a consistent online system with different representations, wherein the online system always uses the most appropriate representation for respective viewers or groups of viewers. The user may directly affect the representations and modify the data with regard to the status of the viewer. For example, the user can affect the representations and modify the data via a user interface (e.g., a graphical user interface) comprising an input interface and an output interface. Thus, the representation of a user profile is not exclusively controlled by the online system and is directly influenced by the user.

The inventive method allows for a flexible representation of the user identity to all interested viewers without compromising the privacy of the data. It also allows for a management of the user profile in an easy and transparent way.

According to an embodiment, said determining comprises associating at least one of two or more levels of privacy with the viewer based on the status of the viewer.

Preferably, the user identity comprises one or more elements, each element describing a characteristic of the user, and at least some of the elements comprise two or more definitions related to different levels of privacy. A user may define display of his names at different levels of privacy. For example, five different levels of privacy, such as invisible, anonymous, nickname only, real name only, and full name may be used for representation of the name. In addition, the user may define display of his visual representation for at least four different levels of privacy, such as a default picture, a "nickname" fantasy picture, a real photograph, or a live visual stream of the user. A realization of a live visual stream, also called Live Profile, applicable in the method, is disclosed in the application entitled "Live representation of users within online systems," filed on Feb. 6, 2012, as U.S. Provisional Patent Application No. 61/595,642, the disclosure of which is incorporated herein by reference.

According to another embodiment, the representation of the user identity comprises for each element of the user identity one of said definitions based on the level of privacy associated with the viewer.

In yet another embodiment, said determining further comprises using a rule-based system to choose a representation of the user identity. The rules may include parameters related to the status of the viewer and may further analyze additional information of the viewer, such as the name of the viewer or a network identification, if the additional information is available to the online system. The rules may generate an output vector that identifies, for each element of the user identity, a respective level of privacy. The rule-based system therefore improves the flexibility of definition of viewer groups. The online system may provide a basic set of rules.

Preferably, the user may modify at least one rule of the rule-based system. Thus, in addition to the general levels of privacy, a user may set several independent rules for representation of his name, picture, and/or further data of his user profile. The user may, for example, define rules related to his friends or good friends granting them access to data of a highest level of privacy.

According to another embodiment, the viewer is another user of the online system and said status of the viewer with regard to the user is determined based on an affiliation within the online system. For example, the user and the viewer may be linked within the online system as friends or may have a similar status indicating a higher level of privacy. Thus, the online system may automatically determine the status of the viewer and present a representation of the profile related to a higher level of privacy if the user and viewer are closely interlinked. In contrast, the online system may present only a representation of the user profile related to a relatively low level of privacy if the other user is not linked to the user in any way.

In yet another embodiment, said levels of privacy include at least some of "Invisible," "Anonymous," "Nickname," "Real," and "Live." The method may allow any combination of settings, including from complete invisibility, i.e., no one can find or see the user profile, to complete public availability of the user profile, i.e., every other user can see any data of the user profile, which may even comprise live updates.

In a further embodiment, said elements include at least one of a name of the user, and a visual representation of the user. A user of a social network may create a profile with his real name and further define a nickname or a fantasy online name. Also, the user can assign a fantasy icon and a real photo of him as a visual representation. Based on the status of the viewer, a suitable representation may be selected for a particular viewer, such as a combination of the nickname and the fantasy icon for standard users of the online system, which are not linked to the user.

According to an embodiment, the online system is a social network.

Furthermore, a computer-readable medium according to the present disclosure having instructions stored thereon is provided, wherein said instructions, when installed and executed on a computing device, cause said computing device to automatically perform a method according to an embodiment of the present disclosure. For example, the computer-readable medium may be accessed by an online system and the instructions may be transferred to at least one server hosting the online system that may execute the instructions. In particular, the instructions may cause the server to configure the online system to enable a viewer to request a user identity of a user of the online system. The online system may further be configured to retrieve a status of the viewer with regard to the user and, based on the retrieved status of the viewer, to determine a representation of the user identity, which is thereafter provided to the viewer.

An online system according to the present disclosure comprises an input interface accessible by a viewer for requesting a user identity of a user of the online system; a processing component configured to retrieve a status of the viewer with regard to the user and, based on the status of the viewer, to determine a representation of the user identity; and an output interface accessible by the viewer for providing the representation of the user identity to the viewer.

In an embodiment, said processing component is further configured to associate at least one of two or more levels of privacy with the viewer based on the status of the viewer.

In an embodiment, said processing component is further configured to use a rule-based system to choose a representation of the user identity.

According to an embodiment, the system further comprises an input interface accessible to the user for modifying at least one rule of the rule-based system.

Furthermore, a user identity of a user of an online system according to the present disclosure is provided, comprising one or more elements, each element describing a characteristic of the user; and at least some of the elements comprising two or more definitions, wherein each definition is related to a different level of privacy.

In yet another embodiment, a representation of the user identity comprises, for each element of the user identity, one of said definitions based on a level of privacy associated with a viewer.

DESCRIPTION OF THE DRAWINGS

Further details, aspects, and characteristics of the present disclosure are described in exemplifying embodiments with reference to the figures of the accompanying drawings, in which.

DETAILED DESCRIPTION

Figure 1:
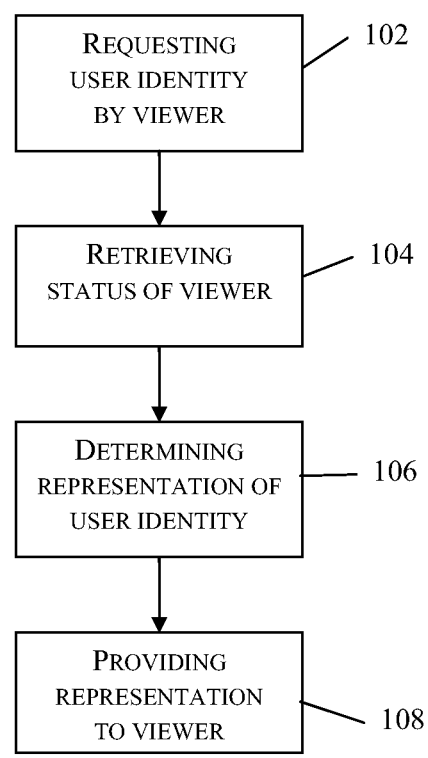
FIG. 1 shows a flow chart of a method according to an aspect of the present disclosure.

FIG. 1 shows a flow chart of a method for privacy-based representation of a user identity within an online system, according to an embodiment of the present disclosure. The method 100 includes steps that may be automatically executed on a server hosting the online system. In step 102 of the method 100, a user identity of a user of the online system is requested by a viewer. For example, the request can be made via a user interface (e.g., a graphical user interface) comprising an input interface and an output interface. The viewer may, for example, access a profile of the user, which may display several indications of the user related to his user identity. The user identity may comprise for each such indication at least one element that describes the corresponding characteristic of the user, such as a name or a visual representation of the user. The server hosting the online system can receive the request. The access is handled by the system, which retrieves a status of the viewer with regard to the user in step 104. The system may, for example, determine if the viewer is a registered user of the online system. If the viewer is registered, the system may determine an affiliation between the viewer and the user. For example, both users may be linked as friends, or the user may be a frequent visitor of content provided by the viewer. Furthermore, the system may apply additional rules provided by the user, which may, for example, grant a certain status to viewers identified by their name or a network identification, such as a host name or an IP address. These factors may be combined by the system to determine the status of the viewer.

Based on the status, the system determines a representation of the user identity in step 106. The determination may comprise a first step, wherein the status is analyzed to associate a level of privacy to the viewer. Each element of the user identity may comprise several definitions which may correspond to the levels of privacy. Preferably, a name of the user may vary for each level of privacy. However, a particular definition of an element of the user identity may also be used for several levels of privacy.

For example, the user name and the entire profile may be invisible on a first level of privacy according to which the viewer may not be identified at all. On a second level of privacy, the profile may be displayed; however, the name of the user may still be hidden. This level of privacy may, for example, be applied to unregistered viewers which, however, have supplied any form of identification. On a third level of privacy, the profile may display a nickname or a fantasy name of the user, for example, to viewers that are registered users of the online system which, however, have no link, connection, or affiliation to the user. At a fourth level of privacy, requiring, for example, a status as a friend of the user, the full name of the user may be displayed. Lastly, at a fifth level of privacy, which may be reserved to good friends that have possibly been directly identified by the user, the full name with further characteristics may be displayed. Further details of this example are disclosed in Table 1.

TABLE 1

Possible definitions of a name of a user related to different levels of privacy.

| Level No. | Level | Sample displayed Name |
|---|---|---|
| 1 | Invisible | No content or profile of the user may be displayed at all. |
| 2 | Anonymous | Content may be displayed, however no connected name is included in the representation, only an indication of "anonymous" is shown. |
| 3 | Nickname only | The stored nickname (e.g., "K-man") may be displayed. |
| 4 | Real Name | The stored real name (e.g., "Karl Fischer") may be displayed. |
| 5 | Full Name | The full real name and nickname (e.g., "Karl K-man Fischer") may be displayed in a combined fashion. |

Similarly, for each level of privacy, the user identity may comprise different definitions for a visual representation of the user. Thus, the content and profile may remain hidden or invisible on a first level of privacy, and only a default icon may be displayed on a second level of privacy, related to anonymous viewers. On a third level of privacy, only a cartoon-like image selected by the user may be presented to other registered users of the online system. A real photograph or image of the user may be shown to friends of the user or other closely affiliated users. Lastly, good friends or other users directly identified by the user may be presented a live stream of the user, such as a Live Profile, whenever the user is connected to the online system. Further details of this example are disclosed in Table 2.

TABLE 2

Possible levels of privacy for a visual representation of a user.

| Level No. | Level | Sample displayed Icon |
|---|---|---|
| 1 | Invisible | No content or profile of the user may be displayed and thus no visual representation is required. |
| 2 | Anonymous | A default "hidden user" icon may be displayed, e.g., a grey silhouette of a portrait. |
| 3 | Nickname picture | The user may upload a cartoon character related to himself, which may be presented. |
| 4 | Real Photo | The user may upload a portrait photograph of himself, which may be presented. |
| 5 | Live Stream | Certain viewers may see a live stream of a video stream of the user within the profile or at another place, where usually a profile icon is displayed. |

The definitions of each element of the user identity corresponding to the level of privacy associated with the viewer may be combined in the representation of the user identity, which is thereafter provided to the viewer in step 108.

Even though method 100 has been described using examples comprising five different levels of privacy for a representation of the name and of a visual representation of the user, it is to be understood that the user identity may also comprise further elements defining other characteristics of the user and that another number of levels of privacy may be used as well. Also, some of the elements may comprise one definition only, which may be used for all levels of privacy. In addition, different levels of privacy may be assigned to a viewer for the respective elements of the user identity. Therefore, the present disclosure is not limited by a certain number of levels of privacy or certain characteristics of the user.

Furthermore, even though methods according to embodiments of the present disclosure have been described, it is to be understood that particular processing steps may be modified, added, and omitted without leaving the scope of the present disclosure. Also, the processing steps may be performed in a different order from the examples described.

Figure 2:
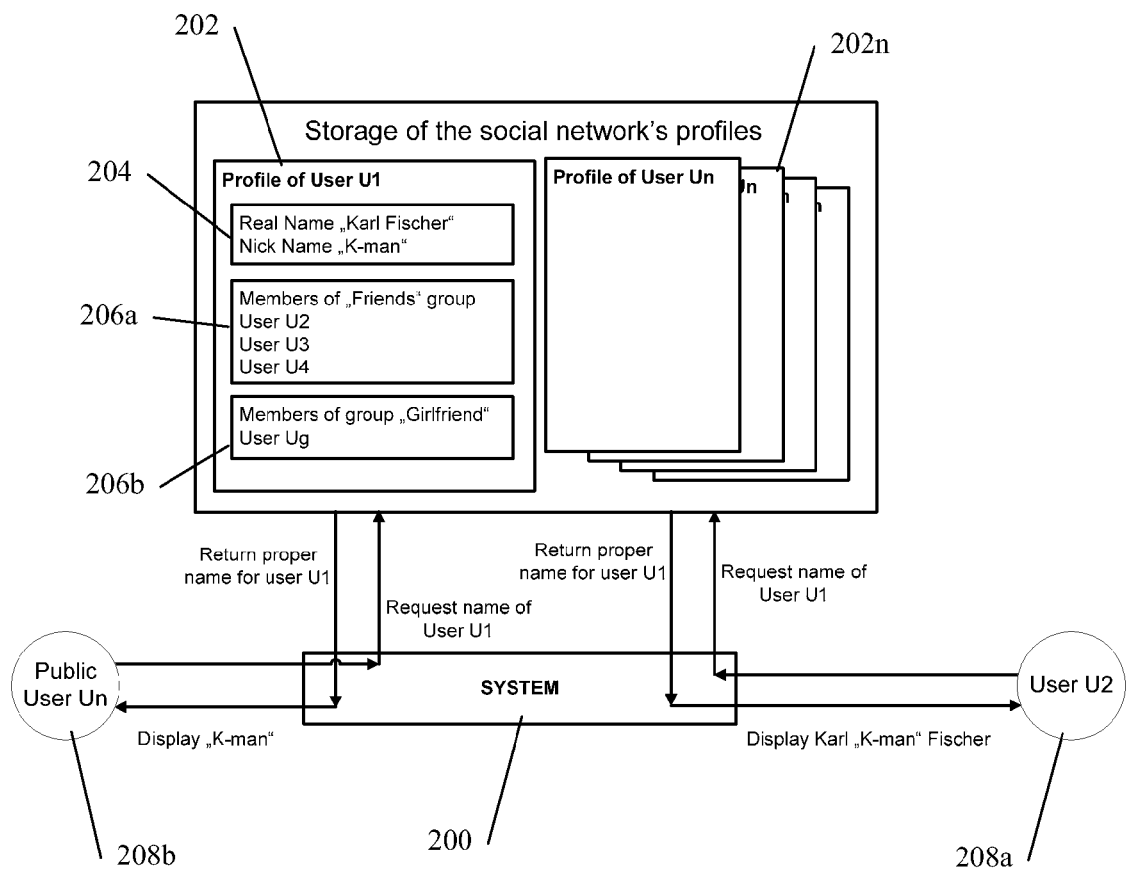
FIG. 2 illustrates a schematic representation of a data structure according to an aspect of the present disclosure, in combination with retrieval of a representation of the user identity.

FIG. 2 illustrates a schematic representation of a data structure according to an embodiment of the present disclosure, in combination with retrieval of a representation of the user identity. An online system 200 according to an embodiment may store for each user a user profile 202, 202n including a definition of user identity that may comprise several elements 204, which specify characteristics of the user. Furthermore, each element 204 may comprise several definitions related to levels of privacy, such as a real name and a nickname of the user. In addition, the user may specify several groups 206a, 206b of other users defining a certain affiliation with the user, such as colleagues, business associates, friends 206a, close friends 206b, and others.

For example, the user may register in a social network and enter "Karl Fischer" as the real name in a register template and "K-man" as his nickname or alter ego name. The user may define several groups of other users, for example, a group of friends, such as the group 206a, and a group including best friends, such as the group 206b. He may now set the combined full name "Karl K-man Fischer" as the representation of his name for all users that are marked as friends, such as the user 208a (identified in the group 206a as user U2). In addition, the social network may automatically determine the real name "Karl Fischer" for display to other users of the social network connected to him in any suitable way, while everyone else, for example, a public viewer 208b, may only see the nickname "K-man" in the profile of the user. In addition, the user may specify that users marked as best friends, such as his girlfriend, will see "Karl" as his name in the profile.

Another user may name himself in the social network "Peter Morgan," which may correspond to his real name, and may further use the nickname "MadPete." He may define rules which affect the representation of his profile, such that all his friends or all connected users will see him as "Peter Morgan," while everyone else will see only his nickname "MadPete" and nothing else that identifies him. However, it is to be understood that the example is not restricted to a representation of a profile page only. Rather, any representation of the identity of the user, for example, coupled to content provided by the user on the social network, may be influenced by the definitions and a respective level of privacy. Thus, any shared content of the user that may be visible to the public will preferably be marked with his nickname, as "from MadPete," without any trace towards his real identity. Yet, if the content is viewed by one of his friends, he will see the content marked as "from Peter Morgan."

Similar to the definition of the name, a user of the social network may select different pictures for profile icons as a visual representation of himself. The user may set a default picture, such as a grey silhouette of a head, as the default icon for all anonymous or other users to be displayed with his profile. However, if users of the social network, which are somehow connected or affiliated to the user, view the profile, a cartoon picture may be presented. In addition, all users that are in his group "best friends" may see a real photograph of the user. Furthermore, if the user is online and enables his video chat, all users in his group "best friends" may see the video stream as his profile icon.

In another example, a user may want to join his friends on the social network and be available for other users he knows, but the user may not want to appear in any public way. Therefore, he may set the level of privacy of his profile and user identity to "invisible" towards any public users and the user may further specify that the anonymous level of privacy is not applicable to anyone. Furthermore, the user may specify that everyone who knows him on the Internet will see his nickname only, his colleagues from work will see his real name, and his real world friends, which he may define in a "friends" group, such as the group 206a, which may be users he knows personally outside the Internet, will see his combined real name and nickname.

Even though the processing and data structures of system 200 have been described in connection with examples specifying certain names and identities of users, it is to be understood that the present disclosure is not limited to particular exemplary user characteristics, levels of privacy, and combinations of representation of a user identity. Rather, levels of privacy discussed in the examples may be omitted and/or further levels of privacy may be defined. Also, it is to be understood that other characteristics of the user, such as an address and further data, and other representations of the user, visual or auditory and others, may be defined as elements with respective definitions for levels of identity in the user identity or profile.

Also, it is to be understood that many modifications to the example embodiments of the disclosure are possible without leaving the scope of the disclosure. In particular, the embodiments may be practiced within the scope of the claims differently from the examples described and the described features and characteristics may be of importance for the disclosure in any combination.

The embodiments of the invention in which an exclusive property or privilege is claimed are defined as follows:

1. A method for representing a user identity within an online system, comprising:
   receiving a request for a user identity of a user of the online system from a viewer;
   retrieving a status of the viewer with regard to the user;
   based on the status of the viewer, determining a representation of the user identity; and
   providing the representation of the user identity to the viewer,
   wherein said determining comprises associating at least one of two or more levels of privacy with the viewer based on the status of the viewer,
   wherein the user identity comprises one or more elements, each element describing a characteristic of the user, and at least some of the elements comprise two or more definitions related to different levels of privacy, and
   wherein the representation of the user identity comprises, for each element of the user identity, one of said definitions based on the level of privacy associated with the viewer, wherein said one or more elements include a visual representation of the user.

2. The method of claim 1, wherein said determining further comprises using a rule-based system to choose the representation of the user identity.

3. The method of claim 2, wherein the user modifies at least one rule of the rule-based system.

4. The method of claim 1, wherein the viewer is another user of the online system and said status of the viewer with regard to the user is determined based on an affiliation within the online system.

5. The method of claim 1, wherein the online system is a social network.

6. The method of claim 1, wherein said definitions of the visual representation of the user comprise at least one of an icon, a photograph, and a live stream of a video stream of the user for respective levels of privacy.

7. An online system, comprising at least one computing device comprising computer-readable media having instructions stored thereon, wherein said instructions are configured to cause the computing device to implement:
   a first input interface accessible by a viewer, wherein the first input interface is configured to generate a request for a user identity of a user of the online system based at least in part on input received from the viewer;
   a processing component configured to retrieve a status of the viewer with regard to the user and, based on the status of the viewer, to determine a representation of the user identity; and
   an output interface accessible by the viewer, wherein the output interface is configured to provide the representation of the user identity to the viewer,
   wherein said processing component is further configured to associate at least one of two or more levels of privacy with the viewer based on the status of the viewer,
   wherein the user identity comprises one or more elements, each element describing a characteristic of the user, and at least some of the elements comprise two or more definitions related to different levels of privacy, and
   wherein the representation of the user identity comprises, for each element of the user identity, one of said definitions based on the level of privacy associated with the viewer, wherein said one or more elements include a visual representation of the user.

8. The system of claim 7, wherein said processing component is further configured to use a rule-based system to choose the representation of the user identity.

9. The system of claim 8, further comprising a second input interface accessible to the user, the second input interface configured to allow the user to modify at least one rule of the rule-based system.

10. The system of claim 7, wherein the viewer is another user of the online system and said status of the viewer with regard to the user is determined based on an affiliation within the online system.

11. The system of claim 7, wherein the online system is a social network.

12. Computer-readable media having instructions stored thereon, wherein said instructions when loaded and executed by a computing device cause said computing device to implement a data structure representing a user identity of a user of an online system, comprising:
   one or more elements, each element describing a characteristic of the user,
   wherein at least some of the elements comprise two or more definitions of the respective characteristic, and
   wherein each definition is related to a different level of privacy,
   wherein said definitions are based on a level of privacy associated with a viewer, and
   wherein said elements include a visual representation of the user.

* * * * *